United States Patent [19]
Rist

[11] 3,921,777
[45] Nov. 25, 1975

[54] FRICTION DISC

[75] Inventor: Michel Rist, Boulogne Billancourt, France

[73] Assignee: Societe Anonyme Francaise du Ferodo, Paris, France

[22] Filed: Nov. 27, 1973

[21] Appl. No.: 419,381

[30] Foreign Application Priority Data

Dec. 8, 1972 France .............................. 72.43713

[52] U.S. Cl. .................................. 192/107 C; 85/37
[51] Int. Cl.² ........................................... F16D 13/69
[58] Field of Search .................................. 192/107 C

[56] References Cited
UNITED STATES PATENTS

| | | | |
|---|---|---|---|
| 2,448,879 | 9/1948 | Gamble............................ | 192/107 C |
| 3,261,439 | 7/1966 | Binder............................. | 192/107 C |
| 3,696,902 | 10/1972 | Dantele............................ | 192/107 C |
| 3,809,200 | 5/1974 | Smales............................ | 192/107 C |

Primary Examiner—Benjamin W. Wyche
Attorney, Agent, or Firm—Young & Thompson

[57] ABSTRACT

A friction disc comprising a support of generally plane shape, having on its periphery curved portions which can be flattened, while offering elastic resistance, when the disc is subjected to a clamping action, friction linings disposed on each side of the support and secured by rivets to the curved portions thereof so that the thickness of the disc and the linings is elastically variable with a lower limit corresponding to complete flattening of the curved portions of the support, and stop means interconnecting the linings and acting in a direction parallel to the axis of the disc to define an upper limit for the thickness of the disc at the linings.

4 Claims, 7 Drawing Figures

FRICTION DISC

BACKGROUND OF THE INVENTION

1. Field of the Invention

This invention relates to a friction disc of the kind comprising a support of generally plane shape and having on its periphery curved portions which can be flattened, while offering elastic resistance, when the disc is subjected to a clamping action, and friction linings disposed on each side of the support and secured by rivets to the said curved portions of the support, so that the thickness of the disc at the linings is elastically variable and has a lower limit corresponding to the complete flattening of the curved portions of the support.

2. Description of the Prior Art

Friction discs of this kind are used for example in clutches, including diaphragm clutches, to permit progressive engagement when the disc is clamped.

When they are released, known friction discs of this kind have a maximum thickness of the linings which depends on the conditions under which the cuved portions of the support are able to return elastically to rest, these conditions often differing from one disc to another and being considerably modified in dependence on temperature.

In some cases this maximum thickness may attain a value such that, even when the clutch is released, the disc is not completely freed but remains subject to permanent clinging contact. This results in a rise in temperature which can only accentuate this disadvantage.

To avoid all risk of permanent clinging contact, it is possible to increase the disengagement travel, but this increases the fatigue of the clutch elements particularly the fatigue of the diaphragm in the case of a diaphragm clutch.

The main object of the present invention is to provide a friction disc of the above kind in which the above disadvantages are minimised or eliminated, and in which the maximum thickness of the disc at the linings is accurately determined and substantially constant whatever the outside conditions, particularly the temperature conditions.

SUMMARY

According to the present invention a friction disc comprises a generally plane support, curved portions on the peripheral portion of said support and flattenable against elastic forces when the disc is subjected to a clamping action, friction linings disposed on opposite sides of said support, rivets securing said linings to said curved portions of said support so that the disc thickness is elastically variable with a lower limit when said curved portions are flattened, and stop means interconnecting said linings and acting in a direction parallel to the disc axis and defining an upper limit of the disc thickness.

Due to this arrangement the maximum thickness of the disc at the linings is accurately determined and substantially constant in all circumstances.

The stop means are so designed that they intervene before the curved portions are allowed to return elastically to complete rest. In a preferred embodiment the stop means are formed by an additional shoulder on the rivets which secure the lining to the support, this shoulder co-operating directly, as a stop, with a bearing surface of the opposite lining to that which is secured to the support by the corresponding rivet.

It will be appreciated that a disc of this invention is of simple construction.

In an alternative construction, the stop means are independent of the rivets securing the linings to the support, and are composed of spacers which allow the linings to move towards one another but prevent them from moving apart beyond a predetermined value.

These spacers may be rivets whose heads co-operate as stops with the linings.

The stop means may be so adjustable as to permit adjustment of the upper limit of the thickness of the disc at the linings.

Preferably, this adjustment can be effected by the rivetting support die, which may selectively have either a plane or a substantially concave shape to modify the position of the stop shoulder of the rivets.

DESCRIPTION OF THE PREFERRED EMBODIMENTS

Figure 1:
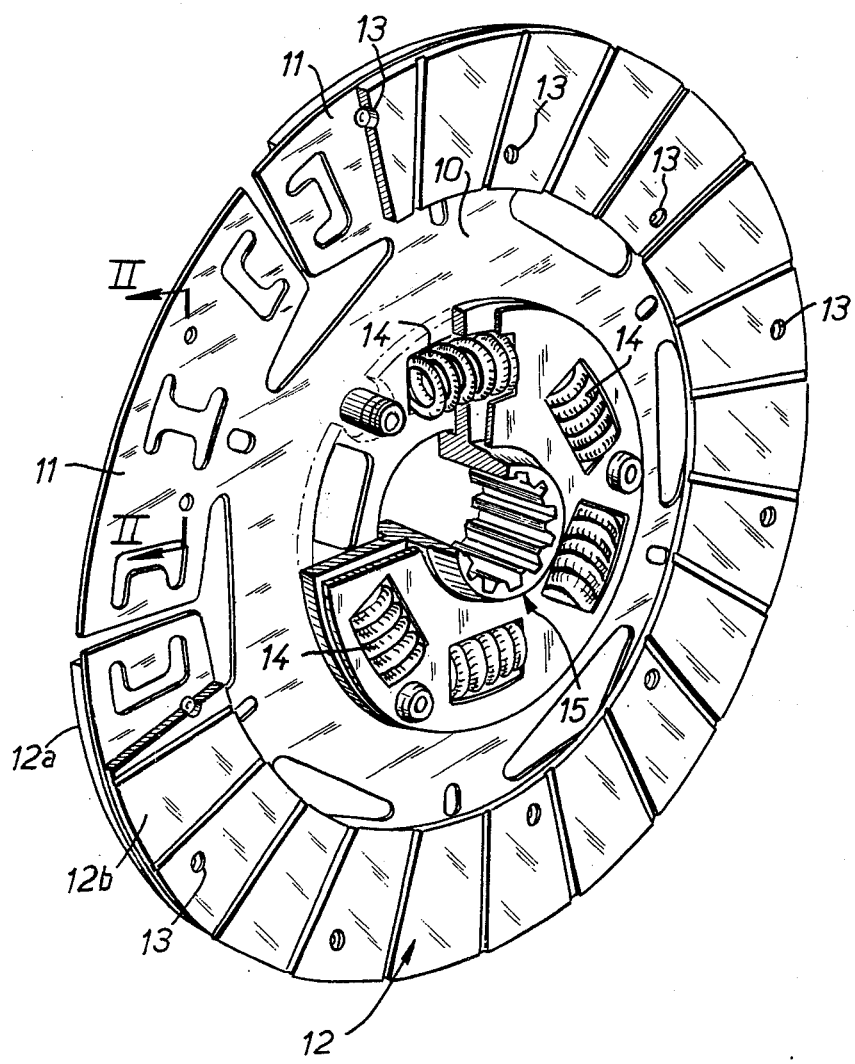
FIG. 1 is a general view in perspective, partly broken away, of a friction disc.

Referring to FIGS. 1 to 4, these show a friction disc for a motor vehicle clutch, and capable of being clamped or unclamped between two plates of the clutch (these plates not being shown). This disc comprises (FIG. 1) a metal support 10 of a generally circular, plane shape perpendicular to the axis of the disc. On its periphery the support 10 has curved portions 11 (FIGS. 1 and 2) which can be flattened, while offering elastic resistance, when the disc is clamped between the plates of the clutch. The disc is provided with linings 12 of friction material which are disposed on each side of the support 10 and secured by rivets 13 to the curved portions 11, so that the thickness of the disc at the linings 12 is elastically variable, having a lower limit which corresponds to the complete flattening (FIG. 3) of the curved portions 11.

The support 10 (FIG. 1) is connected by torsion damping springs 14 to a splined hub 15, which is adapted to be engaged on a shaft (not shown) in such a manner that the shaft is driven by the clutch plates when the disc is clamped between the plates, and to be uncoupled from the plates when they release the disc.

In FIGS. 1 to 4, the curved portions 11 are composed of corrugated segments, while the linings 12 are composed of two linings 12a, 12b having a general annular, plane shape perpendicular to the axis of the disc.

One of these linings 12, designated 12a, is secured (FIG. 2) by some of the rivets 13, designated 13a, on the segments 11 at the apex of the undulations of these segments which are situated on the same side as the lining 12a, while the other lining, designated 12, is secured by the other rivets 13, designated 13b, on the segments 11 at the apex of the undulations thereof which are on the same side as the lining 12b.

Figure 3:
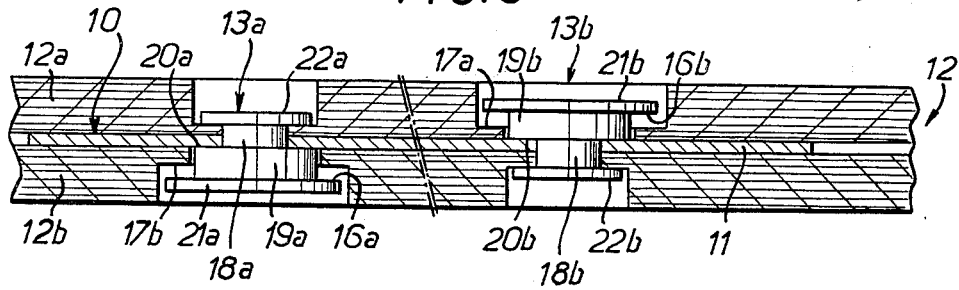
FIG. 3 is a similar view to FIG. 2, but shows the disc clamped and with minimum thickness at the linings.

The rivets 13a which are secured to the lining 12a are so arranged as to allow the lining 12b to move towards the lining 12a, and similarly the rivets 13b which are fixed to the lining 12b are so arranged as to permit the lining 12a to move towards the lining 12b, these movements being possible until the undulations of the sectors 11 are completely flattened (FIG. 3).

Figure 2:
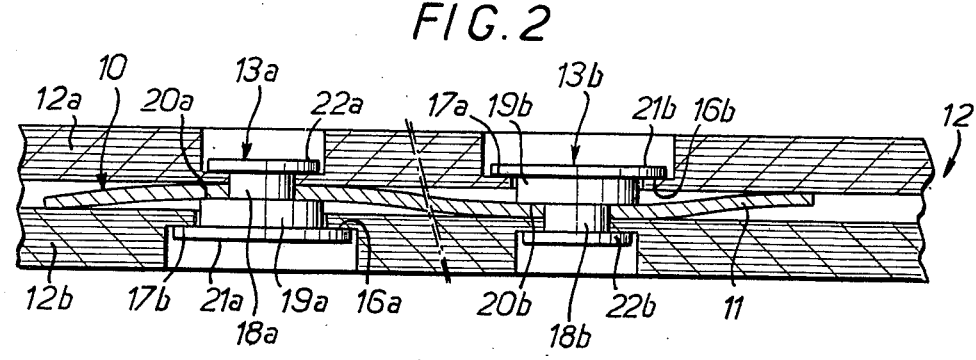
FIG. 2 is a partial view of the disc on a larger scale, taken along the line II—II in FIG. 1, looking in the direction of the arrows, the stop means defining the upper limit of the separation of the disc and the linings being formed by an additional shoulder on the rivets which secure the linings to the support, the disc being shown in the released position in which this limit is reached.

Furthermore, the linings 12a and 12b are interconnected by stop means which act in a direction parallel to the axis of the disc, positively defining an upper limit for the space between the linings, that is to say an upper limit for the thickness of the disc at the linings (FIG. 2). The stop means are so designed that they intervene before the curved portions 11 are allowed to return elastically to complete rest.

In FIGS. 1 to 4, these stop means comprise an additional shoulder 16a on the rivets 13a, which co-operates as a stop with a bearing surface 17b of the lining 12b, and also an additional shoulder 15b on the rivets 13b, which co-operates as a stop with a bearing surface 17a of the lining 12a.

Figure 4:
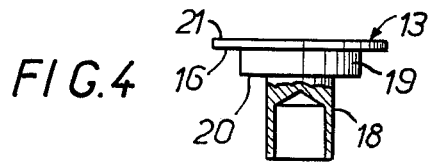
FIG. 4 shows in elevation, and partly in section, one of the rivets of FIGS. 2 and 3, before the riveting.

The various rivets 13a and 13b are in fact all identical and one of them, designated 13, can be seen in FIG. 4 before the riveting operation.

The rivet 13 (FIG. 4) has a tail 18 which is surmounted by a boss 19 forming a support shoulder 20 to permit securing the support on the curved portion 11. This boss 19 is in turn surmounted by a head 21 which forms the additional shoulder 16 bearing against the bearing surface 17 of the linings.

In FIG. 4, the tail 18 of the rivet 13 is hollow. Rivetting is effected by supporting the head 21 against a die, while a tool co-operates with the hollow tail 18 to form a securing flange 22, designated 22a for the rivets 13a and designated 22b for the rivets 13b in FIGS. 2 and 3.

The flange 22a and the shoulder 20a grip between them the lining 12a and the curved portion 11 of the support 10, thus securing them. Similarly, the flange 22b and the shoulder 20b grip between them the lining 12b and the curved portion 11 of the support 10 thus securing them.

Furthermore, by the stops 16a, 17b on the one hand, and 16b, 17a on the other hand, which are formed by the supplementary head 21 of the rivets 13, the maximum thickness of the disc and the linings is accurately defined and remains substantially constant whatever the outside conditions, particularly the temperature conditions.

This results in the disc, while providing smooth clurch operation due to the undulating segments 11, having substantially no variation of maximum thickness at the linings, so that the clutch release travel has a low value and consequently the fatigue of the clutch release elements can be reduced, for example, the fatigue of the diaphragm in a diaphragm clutch.

Figure 5:
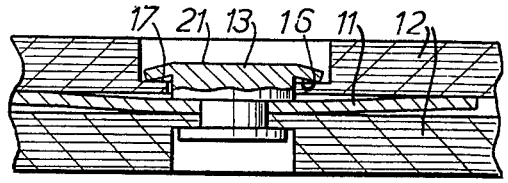
FIG. 5 shows a modified construction in which the additional shoulder of the rivet is folded over during the riveting to reduce the maximum thickness of the disc at the linings.

It will be appreciated that the rivets 13 are capable of being riveted by as simple an operation as if they were rivets of normal shape. It will also be noted that by giving the support die for the heads 21, which are used for the riveting, a shape which is not plane, but concave, for example a dish shape, the release travel of the linings 12 is reduced, while using the same rivets (FIG. 5). This dish-shaped die has the effect that during the riveting the shoulder 16 is folded over to a greater or lesser extent (FIG. 5) depending on whether the die is more or less hollow.

Consequently, with the same standard batch of rivets, it is possible, during the riveting, for the smoothness of travel desired for a production series of discs to be adjusted easily.

In the embodiments in FIGS. 1 to 4 and with reference to FIG. 5, the stop means are composed of an additional head 21 on the rivet 13.

Figure 6:
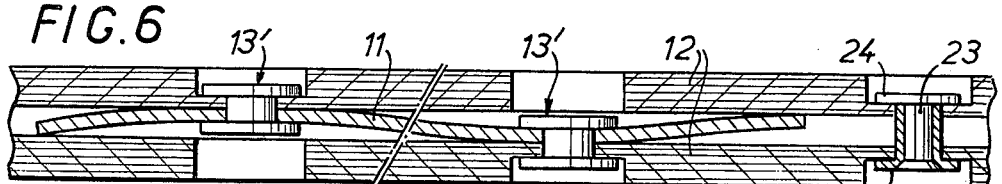
FIG. 6 is a similar view to FIG. 2, but relates to another modified embodiment in which the stop means defining the upper limit of the thickness of the disc at the linings are composed of elements separate from the rivets securing the linings to the support, the disc being in the released position.
Figure 7:
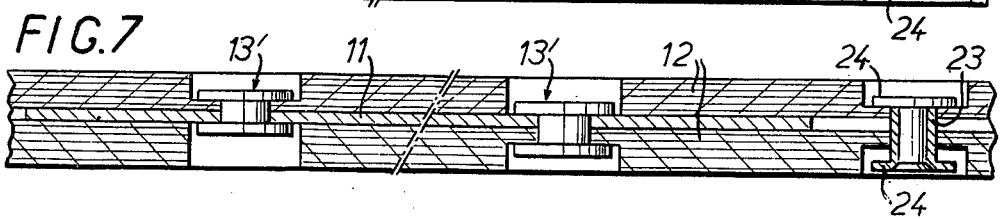
FIG. 7 is a view similar to FIG. 6, but showing the disc in the clamped position.

In the construction shown in FIGS. 6 and 7 the stop means are composed of elements 23 which are separate and independent of the rivets 13, which then have no additional head 21, and which are designated 13'. The elements 23 consists as shown by way of example of spacers having a rivet-like shape, their heads 24 being adapted to bear against the linings 12 to define the upper limit for the spacing (FIG. 6) of the linings, while enabling the linings 12 to move towards one another (FIG. 7) until the undulating segments 11 have been flattened.

The rivets 13' and 23 are shown in FIGS. 6 and 7 as disposed side by side along the same circumference, but they could have other respective situations, for example they could be aligned radially.

I claim:

1. In a friction disc comprising a generally plane support having curved portions at its periphery resiliently flattenable upon a clamping action on the disc, friction linings disposed on opposite sides of said support and each lining being composed of only one layer of homogeneous material, rivets securing said linings to said curved portions, each said rivet having a first head and a shoulder clamping therebetween a portion of one lining and a said support curved portion and a second head defining an upper limit of the disc thickness; the improvement in which the other lining has a bearing surface against which the said second head abuts directly for defining said upper limit, said bearing surface being defined by an annular portion of the material of said other lining, said annular portion being of a thickness less than the thickness of said other lining.

2. A friction disc as claimed in claim 1 wherein said first head and said shoulder have substantially the same diameter while said second head has a larger diameter.

3. A friction disc as claimed in claim 1 wherein said second head is cup-shaped.

4. A friction disc as claimed in claim 1, there being but a single said support between two said friction linings, said support comprising, in the region between said linings, a single thickness of undulating metal sheet.

* * * * *